(12) United States Patent
Chen

(10) Patent No.: US 11,291,940 B2
(45) Date of Patent: Apr. 5, 2022

(54) AIR PURIFIER INCLUDING AIR FILTER LIFE-TIME INDICATOR AND METHOD FOR DETERMINING THE LIFE-TIME OF AN AIR FILTER

(71) Applicant: KONINKLIJKE PHILIPS N.V., Eindhoven (NL)

(72) Inventor: Shuang Chen, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 647 days.

(21) Appl. No.: 16/081,500

(22) PCT Filed: Feb. 27, 2017

(86) PCT No.: PCT/EP2017/054440
§ 371 (c)(1),
(2) Date: Aug. 31, 2018

(87) PCT Pub. No.: WO2017/153189
PCT Pub. Date: Sep. 14, 2017

(65) Prior Publication Data
US 2021/0205746 A1 Jul. 8, 2021

(30) Foreign Application Priority Data

Mar. 8, 2016 (WO) ............... PCT/CN2016/075881
May 24, 2016 (EP) ...................... 16171012

(51) Int. Cl.
*B01D 46/00* (2006.01)
*F24F 11/30* (2018.01)
*B01D 46/44* (2006.01)
*F24F 110/20* (2018.01)
*F24F 11/39* (2018.01)

(52) U.S. Cl.
CPC ....... *B01D 46/0086* (2013.01); *B01D 46/442* (2013.01); *F24F 11/30* (2018.01); *F24F 11/39* (2018.01); *F24F 2110/20* (2018.01)

(58) Field of Classification Search
CPC ... B01D 46/0086; B01D 46/442; F24F 11/30; F24F 11/39
See application file for complete search history.

(56) References Cited

U.S. PATENT DOCUMENTS

2006/0278216 A1    12/2006    Gagas
2009/0298192 A1    12/2009    Parham
2013/0327335 A1    12/2013    Ishikawa

FOREIGN PATENT DOCUMENTS

| CN | 203823896 U | 9/2014 |
| JP | H09-220431 A | 8/1997 |
| JP | H09-280640 A | 10/1997 |
| JP | 4942325 B2 | 5/2012 |
| JP | 2015188875 A | 11/2015 |

(Continued)

*Primary Examiner* — Robert Clemente
(74) *Attorney, Agent, or Firm* — Schott, P.C.

(57) ABSTRACT

An air purifier includes an air inlet and an air outlet. The air purifier further includes a first sensor for determining a water molecule adsorption level of a filter for removing gas pollutants or particles from air propagating from the air inlet to the air outlet. The air purifier furthermore includes a processor that determines a life-time of the filter based on the water molecule adsorption level of the filter measured by the first sensor. Additionally, a method for determining a life-time of a filter for removing gas pollutants or particles from air is described.

20 Claims, 7 Drawing Sheets

(56) References Cited

FOREIGN PATENT DOCUMENTS

| WO | 2012018766 A2 | 2/2012 |
| WO | 2012066453 A1 | 5/2012 |
| WO | 2014055919 A1 | 4/2014 |
| WO | 2015061791 A1 | 4/2015 |

AIR PURIFIER INCLUDING AIR FILTER LIFE-TIME INDICATOR AND METHOD FOR DETERMINING THE LIFE-TIME OF AN AIR FILTER

This application is the U.S. National Phase application under 35 U.S.C. § 371 of International Application No. PCT/EP2017/054440, filed on Feb. 27, 2017, which claims the benefit of International Application No. 16171012.4 filed on May 24, 2016 and International Application No. PCT/CN2016/075881 filed Mar. 8, 2016. These applications are hereby incorporated by reference herein.

FIELD OF THE INVENTION

The present invention relates to air purifying devices that indicate the life-time of installed air filters. The invention also relates to methods for determining the life-time of air filters.

BACKGROUND OF THE INVENTION

In air purifying systems, filters are used to remove particles and gas pollutants from air. Over time, the filter performance decreases leading to less efficient air purification. It is important to accurately determine the life-time of a filter as people suffering from pollution triggered diseases such as COPD or asthma rely on these air purifying systems for staying healthy.

Currently, the life-time of filters is calculated based on the total usage time or the total air flow passing through the air purifier. Due to the difference in outdoor pollution level and different user habits, the estimated filter change time is inaccurate. Therefore, there is a need for a simple and accurate system to measure the filter's lifetime.

WO2012066453 discloses a method for measuring and controlling the purification performance of air treatment devices. Disclosed is an air purifier capable of providing a reliable indication of its performance and a reliable indication as to when a filter unit must be replaced or regenerated. WO2012066453 proposes to measure both $\Phi$ and $\eta$ and to multiply the measurement results in order to obtain a more reliable value of the CADR.

WO2015061791 discloses a positive pressure airflow blower system configured to deliver microbe-free air to a target room.

SUMMARY OF THE INVENTION

In a first aspect of the invention, an air purifier is presented, comprising: an air inlet; an air outlet; a first sensor configured for determining a water molecule adsorption level of a filter for removing gas pollutants or particles from air propagating from the air inlet to the air outlet, e.g. an air filter. A processor is configured to determine a life-time of the filter based on the water molecule adsorption level of the filter.

The air filter may also be already installed in the air purifier. In that case, the air purifier comprises: an air inlet; an air outlet; a filter for removing gas pollutants or particles from air and located to filter air propagating from the air inlet to the air outlet. A first sensor is configured for determining a water molecule adsorption level of the filter. A processor is configured to determine a life-time of the filter based on a water molecule adsorption level of the filter.

According to an embodiment of the invention, the first sensor is a relative humidity sensor positioned for measuring a relative humidity of air filtered by the filter. The sensing of the relative humidity of filtered air is an indirect way of determining the water molecule adsorption level of the filter. A processor is configured to determine the life-time of the filter based on the relative humidity value measured by the first sensor. Thus, in such an embodiment an air purifier is presented, comprising: an air inlet; an air outlet; a first sensor configured for determining a relative humidity of air filtered by a filter for removing gas pollutants or particles from air propagating from the air inlet to the air outlet, when that filter is present; and a processor configured to determine the life-time of the filter based on the relative humidity value of filtered air measured by the first sensor.

According to an embodiment of the invention, the air purifier further comprises a memory. The processor is configured to store a plurality of relative humidity values measured by the first sensor in the memory. The processor is also configure to relate changing characteristics of the plurality of relative humidity values to the life-time of the filter. In other words, the processor is configured to analyze the plurality of relative humidity values, detect changes in the plurality of relative humidity values and relate these detected changes to the life-time of the filter. Detecting changes may comprise, for example, detecting amplitude changes of the relative humidity signals/data.

According to another embodiment of the invention, the air purifier further comprises a memory. The processor is configured to store a plurality of relative humidity datasets measured by the first sensor in the memory. Each dataset comprises different or several relative humidity values of filtered air for a relative humidity value of ambient air. Determining the life-time of the filter is based on the plurality of datasets.

According to an embodiment of the invention, the air purifier further comprises a second sensor positioned for measuring a relative humidity of ambient air. The processor is further configured to determine the life-time of the filter by comparing the relative humidity of ambient air measured by the second sensor with the relative humidity value of filtered air measured by the first sensor.

According to an embodiment of the invention, the air purifier further comprises a memory. The processor is configured to store a plurality of relative humidity datasets measured by the first and the second sensor in the memory. Each dataset comprises different relative humidity values of filtered air for a relative humidity value of ambient air. Determining the life-time of the air filter is based on the plurality of datasets.

According to an embodiment of the invention, the first sensor is positioned on one side of the filter and the second sensor is positioned on the other side of the filter. The one side being the side of filter that receives or is exposed to unfiltered air. The other side being the side of the filter that receives or is exposed to filtered air.

According to an embodiment of the invention, the first sensor is positioned at the air outlet and the second sensor is positioned at the air inlet.

According to a second aspect of the invention, a method for determining a life-time of a filter for removing gas pollutants or particles from air is presented, comprising: providing a filter for removing gas pollutants or particles from air; generating an air flow through the filter thereby filtering air; determining a water molecule adsorption level of a filter after or during filtration; determining the life-time of the filter based on the determined water molecule adsorption level of the filter.

According to an embodiment of the invention, determining a water molecule adsorption level of a filter comprises measuring a relative humidity of filtered air. Determining the life-time of the filter is based on the measured relative humidity values of filtered air. Thus, in such an embodiment a method for determining a life-time of a filter for removing gas pollutants or particles from air is presented, comprises: providing a filter for removing gas pollutants or particles from air; generating an air flow through the filter thereby filtering air; measuring a relative humidity of filtered air; determining the life-time of the filter is based on the measured relative humidity values of filtered air.

According to an embodiment of the invention, measuring a relative humidity of filtered air is performed multiple times. The plurality of measured relative humidity values of filtered air are stored, e.g. in a memory. Determining the life-time of the filter comprises relating changing characteristics of the plurality of relative humidity values to the life-time of the filter. Detecting changes may comprise, for example, detecting amplitude changes of the relative humidity signals/data.

According to an embodiment of the invention, the method further comprises measuring a relative humidity of ambient air. Determining the life-time of the filter is further based on the measured relative humidity values of ambient air.

According to an embodiment of the invention, the measuring of a relative humidity of filtered air and the measuring of a relative humidity of ambient air is performed multiple times. The plurality of measured relative humidity values of filtered and ambient air are stored as a plurality of relative humidity datasets. Each dataset comprises different relative humidity values of filtered air for a particular relative humidity value of ambient air. Determining the life-time of the air filter is based on the plurality of datasets.

According to an embodiment of the invention, measuring the relative humidity of ambient air is performed before generating an air flow.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

Figure 1:
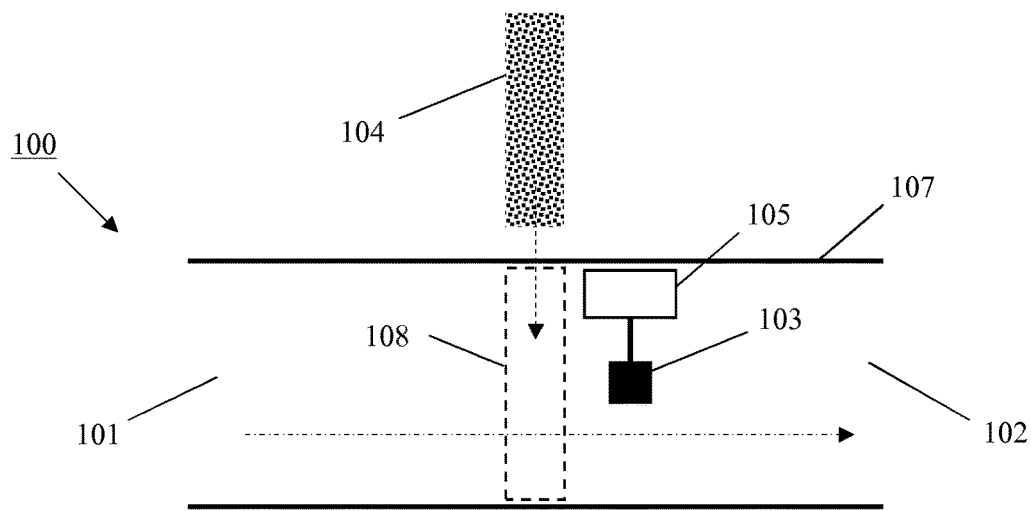
FIG. 1 illustrates an embodiment of an air purifier with an air filter life-time indicator comprising a single sensor, without air filter being installed

Any reference signs in the claims shall not be construed as limiting the scope. In the different drawings, the same reference signs refer to the same or analogous elements.

DETAILED DESCRIPTION OF THE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description. Throughout the description reference is made to "a water molecule adsorption level of the filter". This refers to the amount of water molecules that are adsorbed at the filter surface or by particles present at the filter surface.

The invention solves the problem of detecting a filter's lifetime in a simple and accurate way by determining the level of water molecule adsorption by the filter during or after filtration and relate this level to the life-time of the filter. During air purification, air comprising gas pollutants, particles and water molecules flows through the filter. A part of the water molecules are adsorbed by the filter. It was discovered by the inventors that there is a direct relationship between the performance of the filter regarding gas pollutant or particle removal and the adsorption of water molecules by the filter. They discovered that while a gas filter is adsorbing gas pollutants, water molecules are adsorbed as well. As the performance of the filter decreases over time, the number of adsorbed gas pollutants decreases, as well as the number of adsorbed water molecules. The same holds true for a particle filter in which the particles collected by the filter adsorb water molecules. Thus, the number of water molecules being adsorbed by the filter is an indication of the gas pollutant or particle removal performance of the filter. The ability of the filter to adsorb water molecules can be determined by measuring relative humidity of air after filtration. Hence, by measuring the relative humidity of filtered air, the life-time of a filter can be determined. Particular embodiments of the invention are described below.

In a first aspect of the invention, an air purifier with a life-time indicator for the air filter is presented. The air purifier comprises an air inlet and an air outlet. A filter for filtering particles or removing gas pollutants from air can be inserted and removed from the air purifier. When installed, the filter filters air propagating from the air inlet to the air outlet. The air purifier further comprises a first sensor for determining a water molecule adsorption level of the filter. The first sensor may be configured to continuously monitor the water molecule adsorption level of the filter. Alternatively the first sensor may be configured to monitor the water molecule adsorption level of the filter at pre-determined intervals, e.g. when the air purifier is switched on or off or, e.g. every 5, 10, 20, 30 mins during filtration.

The air purifier further comprises a processor communicatively coupled to the first sensor. The processor is configured for comparing determined water molecule adsorption levels of the filter with pre-determined or known water molecule adsorption levels of the filter for a particular efficiency of the filter. The pre-determined water molecule adsorption levels may be stored in a memory of the processor. The processor may comprise different sets of pre-determined water molecule adsorption levels for different types of filters. The air purifier may comprise a detector for detecting which filter is installed. This information may be used to select the correct set of pre-determined water molecule adsorption levels for a particular type of filter. The processor may comprise different pre-determined water molecule adsorption levels for the same type of filters. Such levels can be used to determine at what stage of its lifetime the filter is. The processor may be an electronic component such as an integrated circuit, e.g. an ASIC. The processor may be a programmable electronic component such as an FPGA.

The air purifier may feature an indicator that is configured to signal to the user when the water molecule adsorption level of the filter reaches a certain critical level. The indicator may be coupled to the processor. The indicator may be an alarm, e.g. a sound alarm or one or more light alarms such as LED indicators. The indicator may also be configured to continuously signal to the user the life-time of the filter, for example via a plurality of light indicators. Such an indication is useful to the user as it allows the user to take precautionary measures before the filter reaches the end of its life-time.

According to an embodiment of the invention, the first sensor is a sensor for measuring relative humidity of air. The first sensor may be an off-the-shelf relative humidity sensor. The first sensor is configured and positioned to measure relative humidity of filtered air when a filter for removing gas pollutants or particles from air propagating from the air inlet to the air outlet is installed in the air purifier. The measured relative humidity of air is an indication of the water molecule adsorption level of the filter. The processor is configured to determine the life-time of the filter based on the relative humidity value measured by the first sensor. The processor is communicatively coupled to the first sensor and configured for comparing measured relative humidity levels with pre-determined relative humidity levels. The pre-determined relative humidity levels may be stored in a memory of the processor. Beforehand the pre-determined relative humidity levels are determined by checking which levels correspond to which efficiency of the air filter. The processor may comprise different sets of pre-determined relative humidity levels for different types of filters. The air purifier may comprise a detector for detecting which filter is installed. This information may be used to select the correct set of pre-determined relative humidity levels for a particular type of filter. The processor may comprise different pre-determined relative humidity levels for the same type of filter. Such levels can be used to determine at what stage of its lifetime the filter is. Such an embodiment is illustrated in FIG. 1 and FIG. 2.

Figure 2:
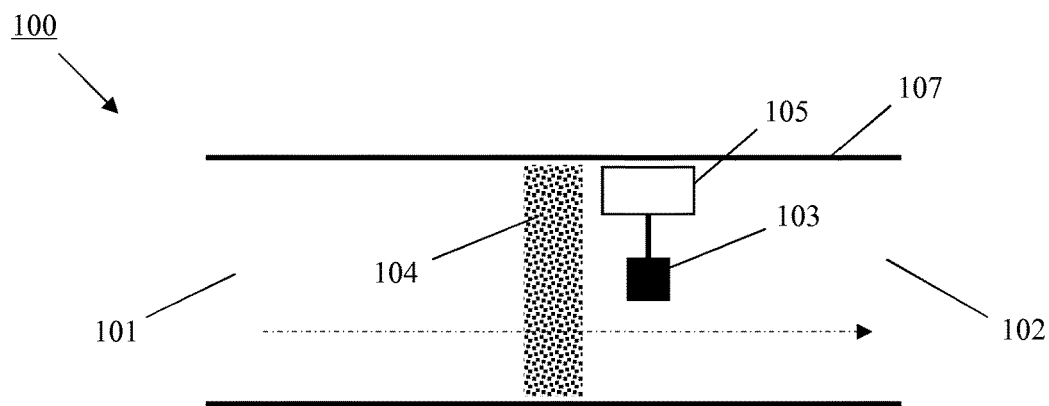
FIG. 2 illustrates an embodiment of an air purifier with air filter life-time indicator comprising a single sensor

In FIG. 1, the illustrated air purifier 100 embodiment comprises an air channel 107 for propagating air from an air inlet 101 to an air outlet 102. The air purifier 100 features a structure 108 for installing a filter 104. The structure 108 allows a filter 104 to be inserted in the air channel 107 such that, when installed, the filter 104 filters air propagating from the air inlet 101 to the air outlet 102. The propagation of air may be achieved by a fan (not illustrated). Inside the air channel 107, a first sensor 103 is located. The first sensor 103 is a relative humidity sensor. The first sensor 103 is located such that the relative humidity of filtered air can be measured. The air purifier 100 further comprises a processor 105 which is coupled to the first sensor 103. In FIG. 2, the illustrated air purifier 100 embodiment is similar to the embodiment illustrated in FIG. 1 but in this embodiment the filter 104 is installed in the air channel 107. Air is propagated in the air channel 107 from the air inlet 101 to the air outlet 102. While the air propagates from inlet 101 to outlet 102, the air is filtered by the filter 104. The relative humidity of the filtered air is measured by the first sensor 103. The relative humidity data of the filtered air is transferred to the processor 105. The processor 105 determines from this data the life-time of the filter 104.

According to an embodiment of the invention, the air purifier comprises a memory. The memory may be part of the processor. The first sensor is configured to measure a plurality of relative humidity values. The processor is configured to store the plurality of relative humidity values measured by the first sensor in the memory and relate changing characteristics of the plurality of relative humidity values to the life-time of the filter. For example, the processor may be configured to determine the difference between measured relative humidity values. If the difference exceeds a pre-determined threshold, this may indicate the end of the life-time of the filter.

EXAMPLE

The first sensor is configured to perform a first relative humidity value of filtered air when a new filter is installed. The installation of a filter may be signaled by a detector present in the air purifier. The first sensor is configured to measure the relative humidity of filtered air at certain intervals or continuously. Each time a relative humidity of filtered air is performed, the processor compares the newly measured relative humidity with the first relative humidity value. From this comparison it can be determined how much water molecules are adsorbed by the filter which directly relates to the life-time of the filter.

Alternatively, the first sensor is configured to perform two or more relative humidity measurements of filtered air at different moments in time. The processor is configured to estimate the end of life-time of the filter from the two or more relative humidity measurements of filtered air, for example, by using interpolation techniques.

According to an embodiment of the invention, the air purifier comprising a memory. The memory may be part of the processor. The processor is configured to store a plurality of relative humidity datasets measured by the first sensor in the memory. Each dataset comprises different relative humidity values of filtered air for a relative humidity value/range of ambient air. The processor is further configured to determine the life-time of the filter based on the plurality of datasets. As an advantage, this embodiment takes into account the relative humidity of ambient air.

To sense relative humidity of ambient air and of filtered air, a single sensor may be used. For example, the first sensor is configured to measure the relative humidity of air when the air flow passes through the filter. The first sensor is further configured to measure the relative humidity of air when there is no air flow passing through the filter, for example when the fan of the air purifier is switched off. Because the first sensor is used for relative humidity measurements of both ambient and filtered air an additional sensor is not needed. This is advantageous because it reduces costs. Because the relative humidity of filtered air depends on the relative humidity of ambient air, different datasets are stored in the memory. Each dataset comprises a plurality of relative humidity values of filtered air for a certain relative humidity value or range of ambient air. Thus, relative humidity values of filtered air are assigned to a particular relative humidity value or range of ambient air. This way, during filtration different datasets are gathered. The determination of the life-time of the filter is performed taking into account all the datasets. As an advantage, a more accurate determination of the life-time of the filter can be performed.

Example 1

On day 1, relative humidity of ambient air is between 50%-60%. During day 1 the relative humidity of filtered air is monitored and stored in a first dataset. The first dataset stores all relative humidity data of filtered air when relative humidity of ambient air is between 50%-60%. On day 2, relative humidity of ambient air is between 80%-90%. During day 2 the relative humidity of filtered air is monitored and stored in a second dataset. The second dataset stores all relative humidity data of filtered air when relative humidity of ambient air is between 80%-90%. On day 3, relative humidity of ambient air is again between 50%-60%. During day 3 the relative humidity of filtered air is monitored and stored in a first dataset. On day 4, relative humidity of ambient air is again between 80%-90%. During day 2 the relative humidity of filtered air is monitored and stored in a second dataset. The life-time of the filter is determined by evaluating the data from the first and the second dataset combined. For example, the life-time of the filter is determined using the first dataset. Thereafter, the life-time of the filter is determined using the second dataset. Thereafter, the total life-time of the filter is determined by combing the life-time information of the filter obtained from the first and the second dataset.

According to an embodiment of the invention, the air purifier comprises a second sensor positioned for measuring a relative humidity of ambient air. For example, the second sensor is positioned to measure the relative humidity of unfiltered air. The processor is further configured to determine the life-time of the filter by comparing the relative humidity of ambient air measured by the second sensor with the relative humidity value measured by the first sensor. For example, the relative humidity value measured by the first sensor is subtracted from the relative humidity value measured by the second sensor. From this difference, the life-time of the filter can be determined. Such an embodiment is illustrated in FIG. 3.

Figure 3:
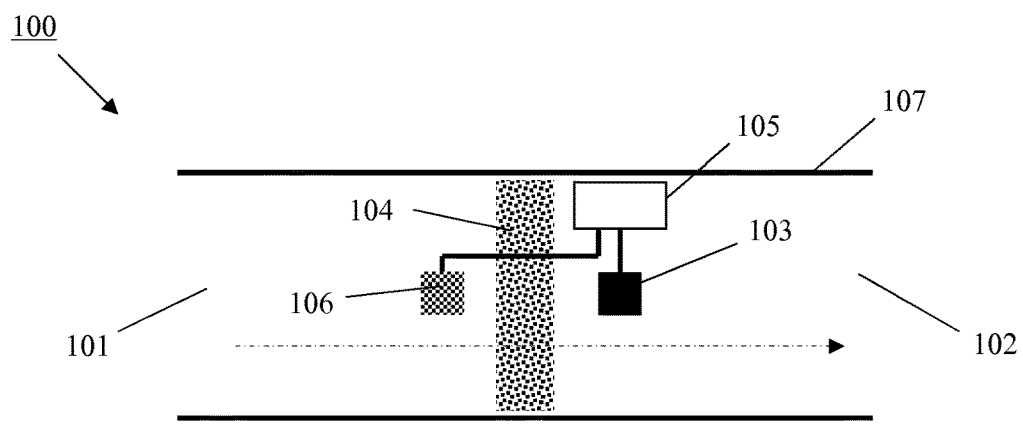
FIG. 3 illustrates an embodiment of an air purifier with air filter life-time indicator comprising two sensors

In FIG. 3, the air purifier 100 embodiment comprises an air channel 107 for propagating air from an air inlet 101 to an air outlet 102. A filter 104 is installed in the air channel 107 and filters air propagating from the air inlet 101 to the air outlet 102. The propagation of air is achieved by, for example, a fan (not illustrated). Inside the air channel 107, a first sensor 103 is located. The first sensor 103 is a relative humidity sensor. The first sensor 103 is located such that the relative humidity of filtered air can be measured. Inside the air channel 107 a second sensor 106 is located. The second sensor 106 is a relative humidity sensor. The second sensor 106 is located such that the relative humidity of unfiltered air can be measured. Thus, the second filter 106 is positioned such that the relative humidity of air is measured before the air is filtered by the filter 104. The air purifier 100 further comprises a processor 105 which is communicatively coupled to the first 103 and the second 106 sensor. The measured relative humidity data of the first 103 and the second 106 sensor is transferred to the processor 105. The processor determines from this data the life-time of the filter 104.

According to an embodiment of the invention, the air purifier comprises a memory. The memory may be part of the processor. The processor is configured to store a plurality of relative humidity datasets measured by the first and the second sensor in the memory. Each dataset comprises different relative humidity values of filtered air for a relative humidity value or range of ambient air. The processor is configured to determine the life-time of the air filter is based on the plurality of datasets. As an advantage, this embodiment takes into account the relative humidity of ambient air. The first sensor is configured/positioned to measure the relative humidity of filtered air. The second sensor is configured/positioned to measure the relative humidity of ambient air. Because the relative humidity of filtered air depends on the relative humidity of ambient air, different datasets are stored in the memory. Each dataset comprises a plurality of relative humidity values of filtered air for a certain relative humidity value or range of ambient air. Thus, one or more relative humidity values of filtered air are assigned to a particular relative humidity value or range of ambient air. This way, over time, different datasets are gathered. The determination of the life-time of the filter is performed taking into account all the datasets, as explained above in example 1. As an advantage, a more accurate determination of the life-time of the filter can be performed.

According to a particular embodiment of the invention, the first sensor is positioned on one side of the filter and the second sensor is positioned on the other side of the filter. This allows one sensor to be used for sensing relative humidity of filtered air and another sensor to be used for sensing relative humidity of unfiltered or ambient air. According to a particular embodiment the first sensor is positioned at the air outlet and the second sensor is positioned at the air inlet.

Figure 4:
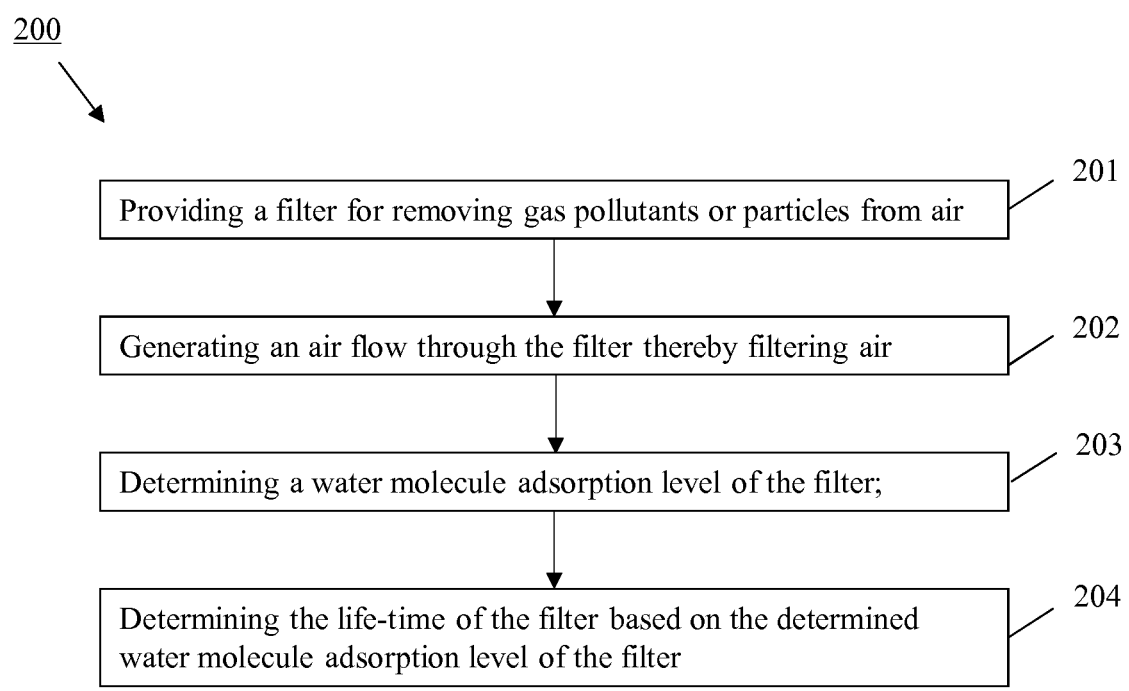
FIG. 4 illustrates an embodiment of a method for determining the life-time of a filter

According to a second aspect of the invention and as illustrated in FIG. 4, a method 200 for determining a life-time of a filter for removing gas pollutants or particles from air is presented. The method comprises: providing 201 a filter for removing gas pollutants or particles from air, generating 202 an air flow through the filter thereby filtering air; determining 203 a water molecule adsorption level of the filter, and determining 204 the life-time of the filter based on the measured water molecule adsorption level of the filter.

According to an embodiment of the invention, determining 204 the life-time of the filter based on the measured water molecule adsorption level of the filter comprises comparing the determined water molecule adsorption levels of the filter with pre-determined water molecule adsorption levels of the filter. Pre-determined water molecule adsorption levels may be values that are determined during earlier performed experiments for a particular filter type. During such experiments it is determined what the efficiency or life-time of the filter is for one or more particular water molecule adsorption levels of the filter.

According to an embodiment, the method 200 may further comprise a step of determining the type of the filter. Further, determining 204 the life-time of the filter based on the measured water molecule adsorption level of the filter comprises comparing determined water molecule adsorption levels of the filter with pre-determined water molecule adsorption levels of the determined filter type.

According to an embodiment of the invention, the method 200 further comprises a step of activating an alarm such as a sound alarm or a light alarm when the water molecule adsorption level of the filter reaches a certain pre-determined critical level. According to an embodiment of the invention, the method 200 further comprises a step of indicating to the user the life-time of the filter instead of indicating only the end of life-time, e.g. using a series of LEDS or display a life-time percentage value.

Figure 5:
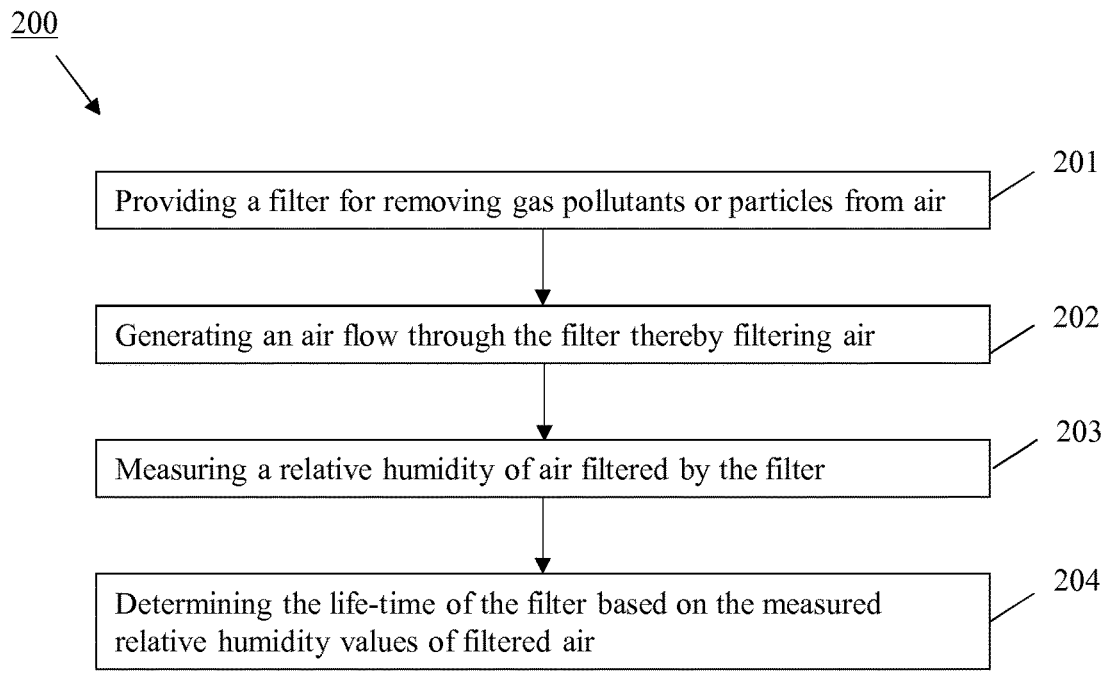
FIG. 5 illustrates an embodiment of a method for determining the life-time of a filter

According to an embodiment of the invention and as illustrated in FIG. 5, determining 204 a water molecule adsorption level of the filter comprises measuring the relative humidity of filtered air. Further, determining the life-time of the filter is based on the measured relative humidity values of filtered air.

According to an embodiment of the invention, determining 204 the life-time of the filter based on the measured relative humidity values of filtered air comprises comparing measured relative humidity values of filtered air with pre-determined relative humidity values of air filtered by the filter. Pre-determined relative humidity values of air may be values that are determined during earlier performed experiments for a particular filter type. During such experiments it is determined what the efficiency or life-time of the filter is for one or more particular relative humidity values of air filtered by a filter. According to an embodiment, the method 200 may further comprise a step of determining the type of the filter. Further, determining 204 the life-time of the filter based on the measured relative humidity values of filtered air comprises comparing measured relative humidity values of filtered air with pre-determined relative humidity values of air filtered by the determined filter type.

Figure 6:
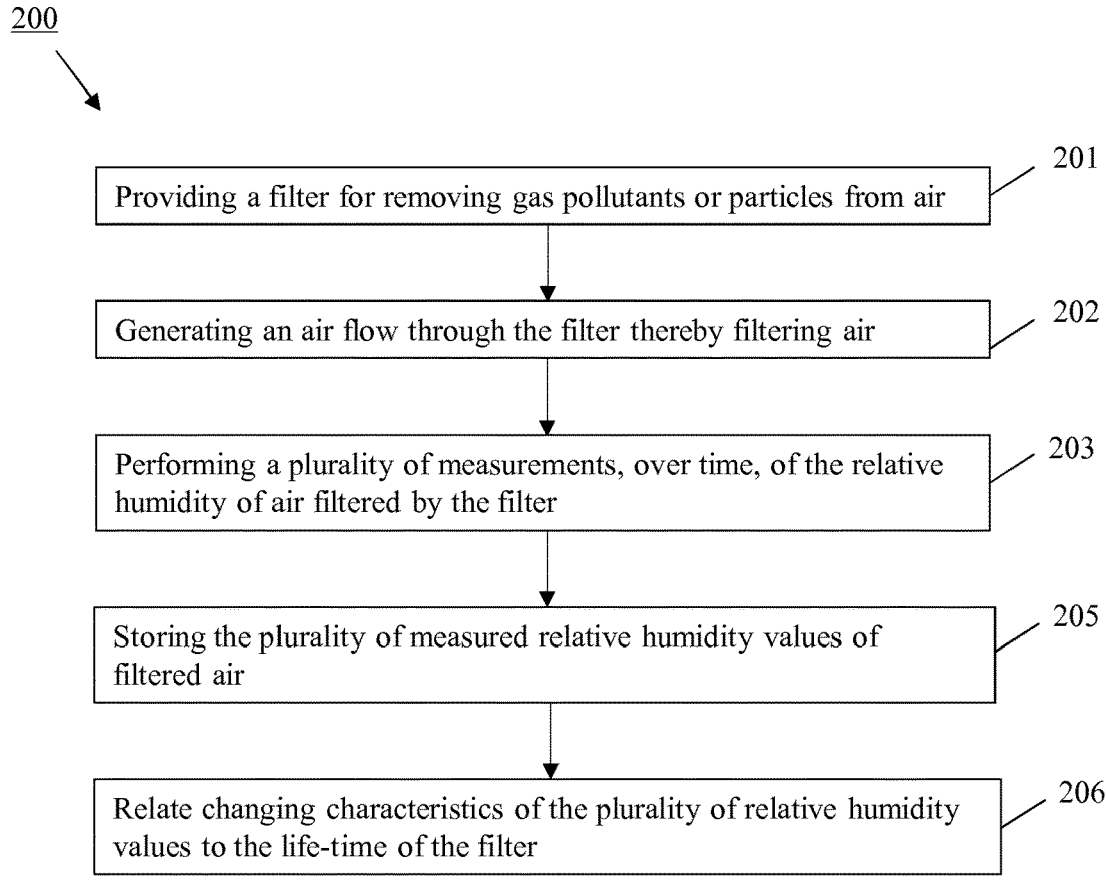
FIG. 6 illustrates an embodiment of a method for determining the life-time of a filter

According to an embodiment of the invention and as illustrated in FIG. 6, measuring 203 a relative humidity of filtered air is performed multiple times. Further, the plurality of measured relative humidity values of filtered air are stored 205. Further, determining 204 the life-time of the filter comprises relating changing characteristics of the plurality of relative humidity values to the life-time of the filter 206. For example, determining the life-time of the filter may be done by determining the difference between measured relative humidity values. If the difference exceeds a pre-determined threshold, this may indicate the end of the life-time of the filter. For example, determining the life-time of the filter may be done by performing two or more relative humidity measurements of filtered air at different moments in time and use the two or more measurements to determine the end of the life-time of the filter, for example by using interpolation techniques.

Figure 7:
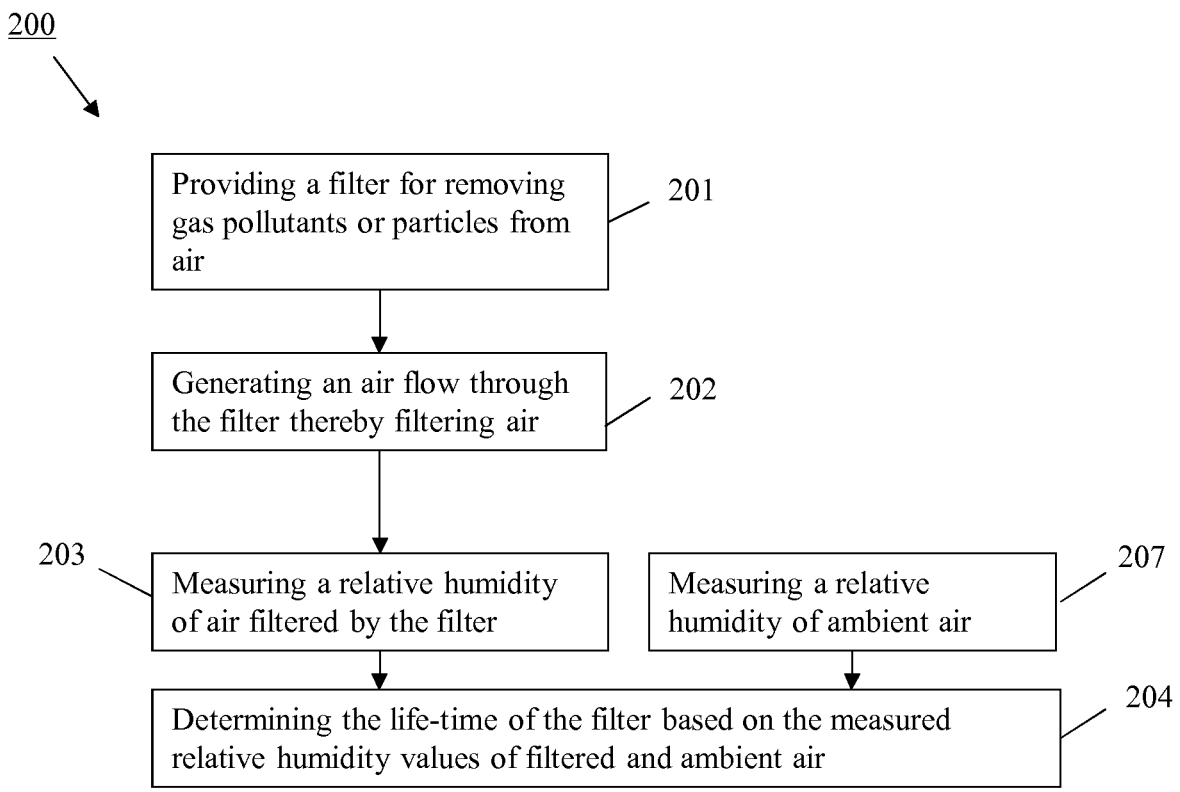
FIG. 7 illustrates an embodiment of a method for determining the life-time of a filter

According to an embodiment of the invention and as illustrated in FIG. 7, the method 200 further comprises measuring 207 a relative humidity of ambient air. Determining 204 the life-time of the filter is further based on the measured relative humidity values of ambient air. For example, the life-time of the filter is determined by comparing the relative humidity of ambient air with the relative humidity of filtered air. The comparison may comprise subtracting the relative humidity of filtered air from the relative humidity of ambient air. The difference between the two values is an indication of the amount of water molecules that are adsorbed by the filter's surface or by particles filtered out by the filter. As an advantage, by taking into account the actual relative humidity of ambient air, a more accurate determination of the life-time of the filter can be done. Also, it allows the air purifier to accurately perform in different humidity conditions and different locations in the world.

Figure 8:
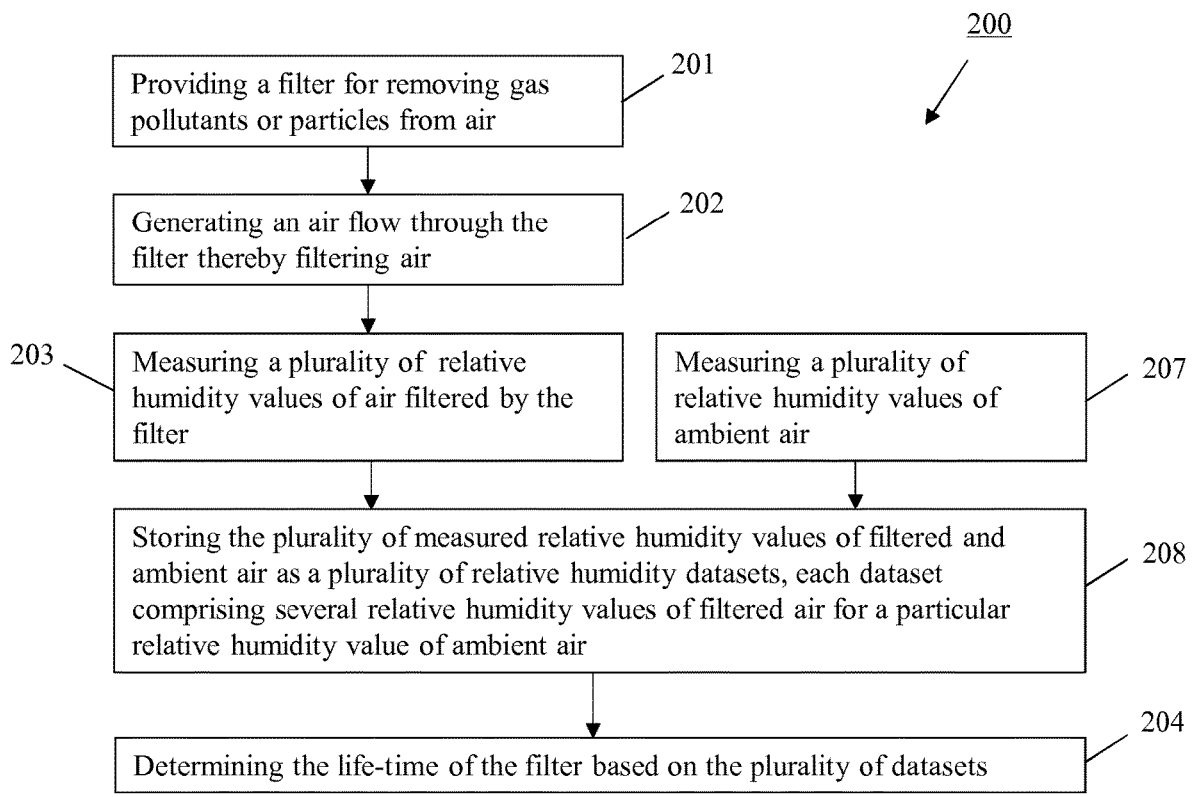
FIG. 8 illustrates an embodiment of a method for determining the life-time of a filter

According to an embodiment of the invention and as illustrated in FIG. 8, measuring 203 of a relative humidity of filtered air and the measuring 207 of a relative humidity of ambient air is performed multiple times. The plurality of measured relative humidity values of filtered and ambient air are stored 208 as a plurality of relative humidity datasets. Each dataset comprising different relative humidity values of filtered air for a particular relative humidity value or range of ambient air. Determining 204 the life-time of the filter is based on the plurality of datasets, as described earlier. Because the relative humidity of filtered air depends on the relative humidity of ambient air, different datasets are stored. Each dataset comprises a plurality of relative humidity values of filtered air for a certain relative humidity value or range of ambient air. Thus, relative humidity values of filtered air are assigned to a particular relative humidity value or range of ambient air. This way, over time, different datasets are gathered. The determination of the life-time of the filter is performed taking into account all the datasets, as explained above in example 1. As an advantage, a more accurate determination of the life-time of the filter can be performed.

Figure 9:
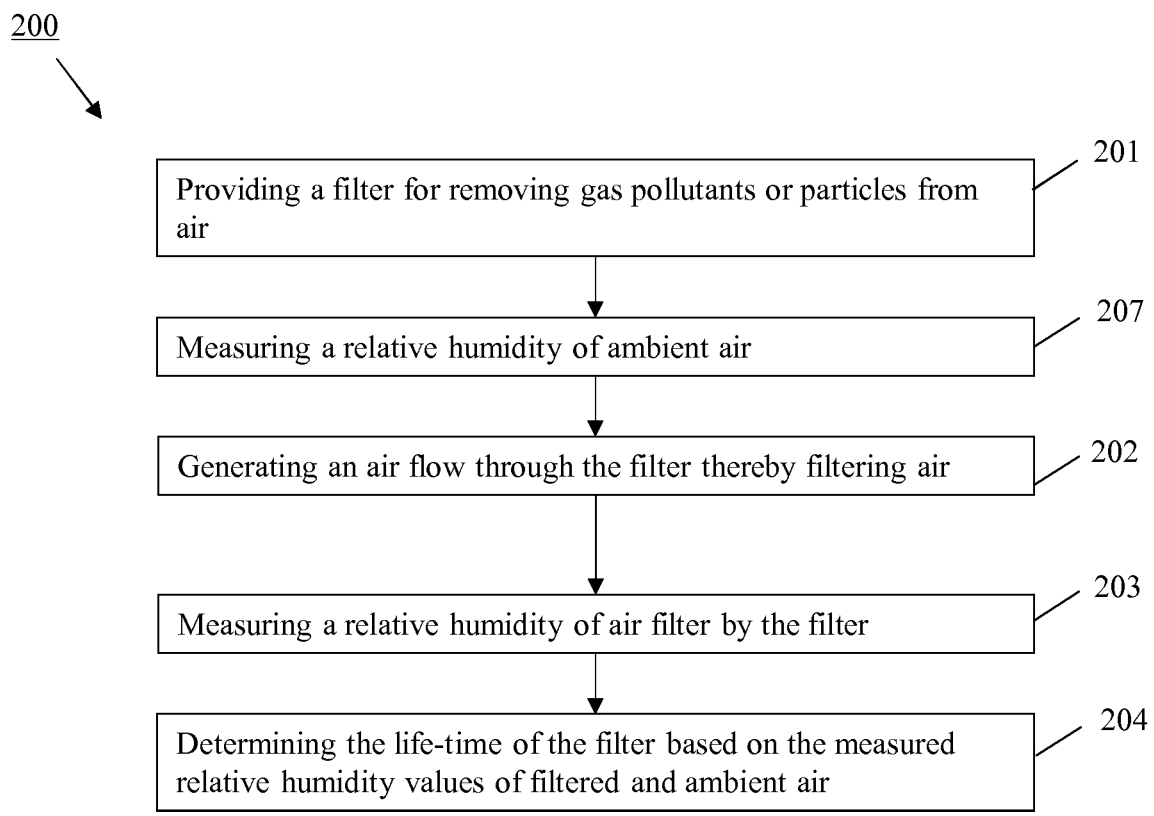
FIG. 9 illustrates an embodiment of a method for determining the life-time of a filter

According to an embodiment of the invention, and as illustrated in FIG. 9, measuring 207 the relative humidity of ambient air is performed before generating 202 an air flow. For example, when the fan of the air purifier is switched off. It is an advantage that by doing so, the same sensor can be used to measure both measuring relative humidity of ambient air and of filtered air.

Figure 10:
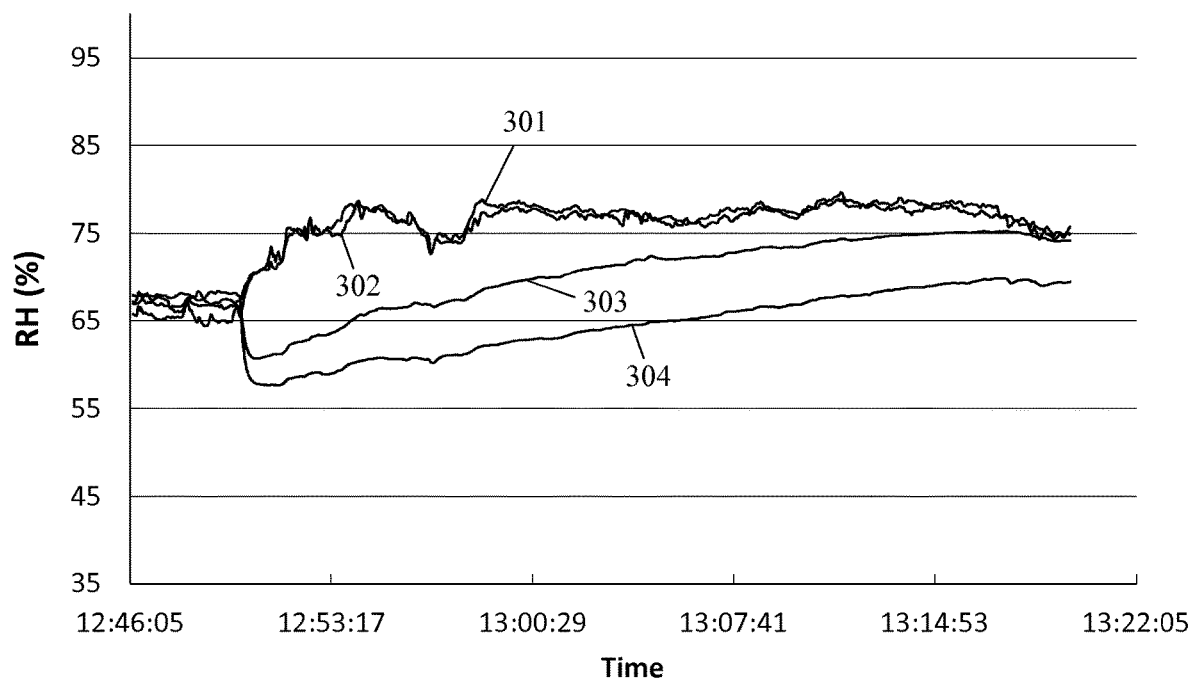
FIG. 10 is a graph illustrating relative humidity data obtained during experiments

Experimental Data:

FIG. 10 is a graph illustrating relative humidity data obtained during experiments. During the experiments, an air filter of the type AC 4167 was used. With this filter type, two experiments were performed.

In a first experiment a new filter of type AC 4167 was installed in the air purifier. Line 304 illustrates the relative humidity after filtration, at the air outlet of the air purifier. Line 301 illustrates the relative humidity before filtration, at the air inlet of the air purifier. At the start of the experiment, the difference between relative humidity at air inlet and at air outlet is large because large amounts of water molecules are adsorbed by the filter. It can be noticed that as the experiment is progressing, the difference between the relative humidity at the air inlet and the relative humidity at the air outlet decreases because as the performance of the filter decreases, its ability to adsorb water molecules decreases also.

In a second experiment, an air filter of type AC4167 is used. Before performing the experiment, the air filter is exposed to cigarette smoke of circa 225 cigarettes. The clean air delivery rate in a chamber test showed that its particle removal performance was reduced by 50%. Line 303 illustrates the relative humidity after filtration, at the air outlet of the air purifier. Line 302 illustrates the relative humidity before filtration, at the air inlet of the air purifier. This experiment further proves that fact that as the performance of the filter decreases, its ability to adsorb water molecules decreases also.

From these experiments it is concluded that the life-time of an air filter can be determined by determining the water molecule adsorption level of the air filter or by measuring the relative humidity of air filtered by the air filter. It is also confirmed that the water molecule adsorption level of the air filter can indeed be determined by measuring the relative humidity of air filtered by the air filter.

Figure 11:
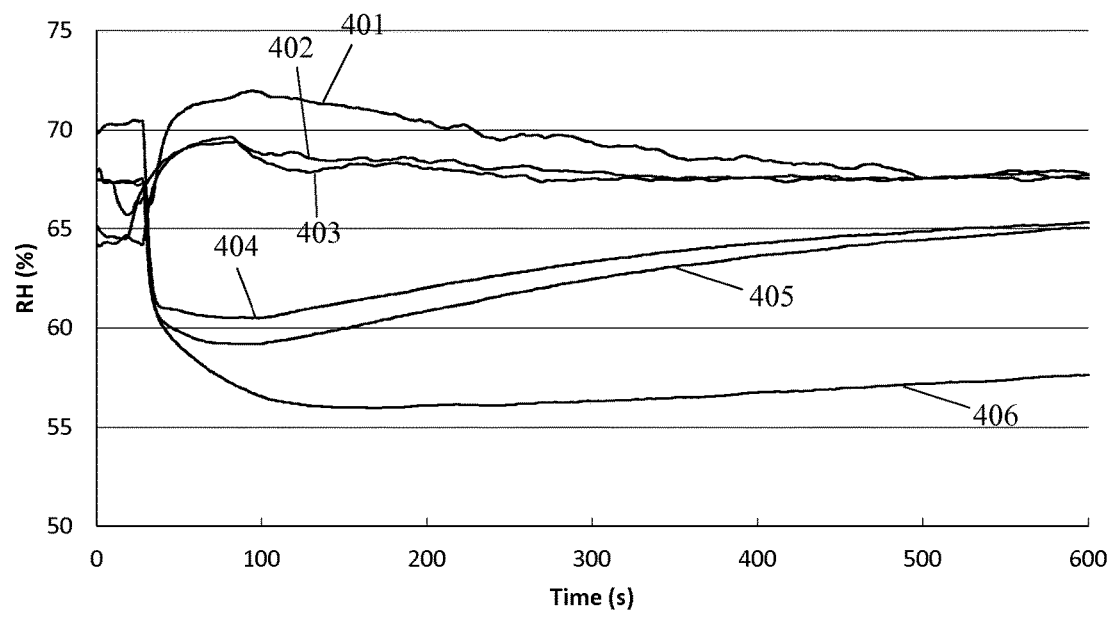
FIG. 11 is a graph illustrating relative humidity data obtained during experiments The drawings are only schematic and are non-limiting. In the drawings, the size of some of the elements may be exaggerated and not drawn on scale for illustrative purposes.

FIG. 11 is a graph illustrating relative humidity data obtained during another set of experiments. During these experiments, a filter of type AC 4138 was used. Air was propagated through the filter and during filtration relative humidity values at the air inlet and the air outlet were measured.

In a first experiment, a new filter of type AC 4138 was used. Line 401 illustrates the measured relative humidity of unfiltered air. Line 406 illustrates the measured relative humidity of filtered air.

In a second experiment, the filter AC4138 was exposed to the smoke of circa 160 cigarettes. Line 402 illustrates the measured relative humidity of unfiltered air. Line 405 illustrates the measured relative humidity of filtered air.

In a third experiment, the filter AC4138 was exposed to the smoke of circa 240 cigarettes. Line 403 illustrates the measured relative humidity of unfiltered air. Line 404 illustrates the measured relative humidity of filtered air.

From the three experiments it can be concluded that during filtration, the relative humidity of filtered air increases. This confirms the fact that over time, as the performance of the filter decreases, less water molecules are adsorbed by the filter.

The invention claimed is:

1. An air purifier, comprising:
   an air inlet;
   an air outlet;
   a filter for removing gas pollutants or particles from air propagating from the air inlet to the air outlet;
   a first sensor positioned for determining a water molecule adsorption level of the filter; and
   a processor configured to determine a life-time of the filter based on the water molecule adsorption level of the filter measured by the first sensor.

2. The air purifier according to claim 1, wherein the first sensor is a relative humidity sensor positioned for measuring a relative humidity of air filtered by the filter, and wherein the processor is configured to determine the life-time of the filter based on the relative humidity value measured by the first sensor.

3. The air purifier according to claim 2, further comprising a memory, wherein the processor is configured to store a plurality of relative humidity values measured by the first sensor in the memory and relate changing characteristics of the plurality of relative humidity values to the life-time of the filter.

4. The air purifier according to claim 2, further comprising a memory, wherein the processor is configured to store a plurality of relative humidity datasets measured by the first sensor in the memory, each dataset comprising different relative humidity values of filtered air for a relative humidity value of ambient air, and wherein determining the life-time of the filter is based on the plurality of relative humidity datasets.

5. The air purifier according to claim 2, further comprising a second sensor positioned for measuring a relative humidity of ambient air, and wherein the processor is further configured to determine the life-time of the filter by comparing the relative humidity of ambient air measured by the second sensor with the relative humidity value measured by the first sensor.

6. The air purifier according to claim 5, further comprising a memory, wherein the processor is configured to store a plurality of relative humidity datasets measured by the first sensor and the second sensor in the memory, each dataset comprising different relative humidity values of filtered air for a relative humidity value of ambient air, and wherein determining the life-time of the air filter is based on the plurality of relative humidity datasets.

7. The air purifier according to claim 5, wherein the first sensor is positioned on one side of the filter, and wherein the second sensor is positioned on an other side of the filter.

8. The air purifier according to claim 7, wherein the first sensor is positioned at the air outlet, and wherein the second sensor is positioned at the air inlet.

9. The air purifier according to claim 1, wherein the filter is a removable filter.

10. The air purifier according to claim 1, wherein the air purifier further comprising an indicator configured to signal the life-time of the filter to a user.

11. The air purifier according to claim 1, wherein the indicator is a sound alarm or a light alarm.

12. The air purifier according to claim 1, wherein the air purifier further comprising a detector for detecting a type of the filter.

13. A method for determining a life-time of a filter for removing gas pollutants or particles from air, the method comprising:
providing the filter for removing the gas pollutants or particles from air;
generating an air flow through the filter thereby filtering air;
determining, by using a sensor, a water molecule adsorption level of the filter; and
determining the life-time of the filter based on the determined water molecule adsorption level of the filter.

14. The method according to claim 13, wherein determining the water molecule adsorption level of the filter comprises measuring a relative humidity of filtered air; and wherein determining the life-time of the filter is based on the measured relative humidity values of filtered air.

15. The method according to claim 14, wherein measuring the relative humidity of filtered air is performed multiple times,
wherein the plurality of measured relative humidity values of filtered air are stored, and
wherein determining the life-time of the filter comprises relating changing characteristics of the plurality of relative humidity values to the life-time of the filter.

16. The method according to claim 14, further comprising measuring a relative humidity of ambient air, and wherein determining the life-time of the filter is further based on the measured relative humidity values of ambient air.

17. The method according to claim 16, wherein the measuring of the relative humidity of filtered air and the measuring of the relative humidity of ambient air is performed multiple times,
wherein the plurality of measured relative humidity values of the filtered and ambient air are stored as a plurality of relative humidity datasets, each dataset comprising different relative humidity values of the filtered air for a particular relative humidity value of the ambient air, and
wherein determining the life-time of the air filter is based on the plurality of datasets.

18. The method according claim 16, wherein measuring the relative humidity of ambient air is performed before generating the air flow.

19. The air purifier according to claim 12, wherein the type of the filter is used to select a set of pre-determined water molecule adsorption levels for the detected type of the filter.

20. The air purifier according to claim 19, wherein a pre-determined water molecule adsorption level from the set of pre-determined water molecule adsorption levels is used to determine a current lifetime stage of the filter.

* * * * *